US012440136B2

(12) United States Patent
Zavesky et al.

(10) Patent No.: US 12,440,136 B2
(45) Date of Patent: Oct. 14, 2025

(54) EMOTION DETECTION AND TRANSLATION FOR ELECTRONIC COMMUNICATIONS

(71) Applicant: AT&T Intellectual Property I, L.P., Atlanta, GA (US)

(72) Inventors: Eric Zavesky, Austin, TX (US); James Pratt, Round Rock, TX (US); Yupeng Jia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 454 days.

(21) Appl. No.: 18/046,641

(22) Filed: Oct. 14, 2022

(65) Prior Publication Data

US 2024/0122511 A1  Apr. 18, 2024

(51) Int. Cl.
*A61B 5/16* (2006.01)
*G06F 40/30* (2020.01)
*G06V 40/16* (2022.01)
*H04N 7/14* (2006.01)

(52) U.S. Cl.
CPC .............. *A61B 5/165* (2013.01); *G06F 40/30* (2020.01); *G06V 40/174* (2022.01); *H04N 7/147* (2013.01)

(58) Field of Classification Search
CPC ......... H04N 7/147; G06F 40/30; A61B 5/165; A61B 5/01; A61B 5/7264; A61B 5/744; G06V 40/174
See application file for complete search history.

(56) References Cited

U.S. PATENT DOCUMENTS 10,116,598 B2 * 10/2018 Tucker .................... H04L 51/10
10,783,727 B2 *  9/2020 Zavesky ................ A61B 5/082
11,587,561 B2 *  2/2023 Weir .................... G10L 15/1815

\* cited by examiner

*Primary Examiner* — An H Do
(74) *Attorney, Agent, or Firm* — Guntin & Gust, PLC; John G. Rauch

(57) ABSTRACT

The described technology is generally directed towards emotion detection and translation for electronic communications. An emotional state of a first communication participant can be detected, e.g., through face recognition, biometric information, and/or communication content analysis. The emotional state can be encoded in metadata that can accompany the communication content. The metadata can be translated into one or more embellishments that represent the emotional state, and the embellishments can be inserted into the communication content. The embellished communication content can then be delivered to a second communication participant.

20 Claims, 10 Drawing Sheets

EMOTION DETECTION AND TRANSLATION FOR ELECTRONIC COMMUNICATIONS

TECHNICAL FIELD

The subject application is related to electronic communications, and more particularly, to device and communication network features, e.g., emotion detection and translation, to improve communication of emotional states.

BACKGROUND

As intra-personal communication channels diversify to include, for example, audio, video, text, avatars, audio/video/text translations and interpretations, auto responses, etc., communicating the emotional state of each party has become increasingly difficult and error prone. For example, when a person sends a text message to a group of recipients, the mood, intent, or underlying meaning behind the words can easily be lost, misconstrued, or interpreted differently by different members of the group. The recipients of a text message may not, for example, pick up on sarcasm of text messages from a sender, particularly if they are not familiar with the communication style of the sender.

The problem is exacerbated by cross modal communications, for example, electronic text-to-voice conversion, conversion of text or audio to video or avatar interactions, or translation between different languages. As an example, emotional cues conveyed in one language can easily be lost in translation to a different language. Similarly, emotional cues such as facial expression and body language can be lost in translating video to text, or vice versa.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
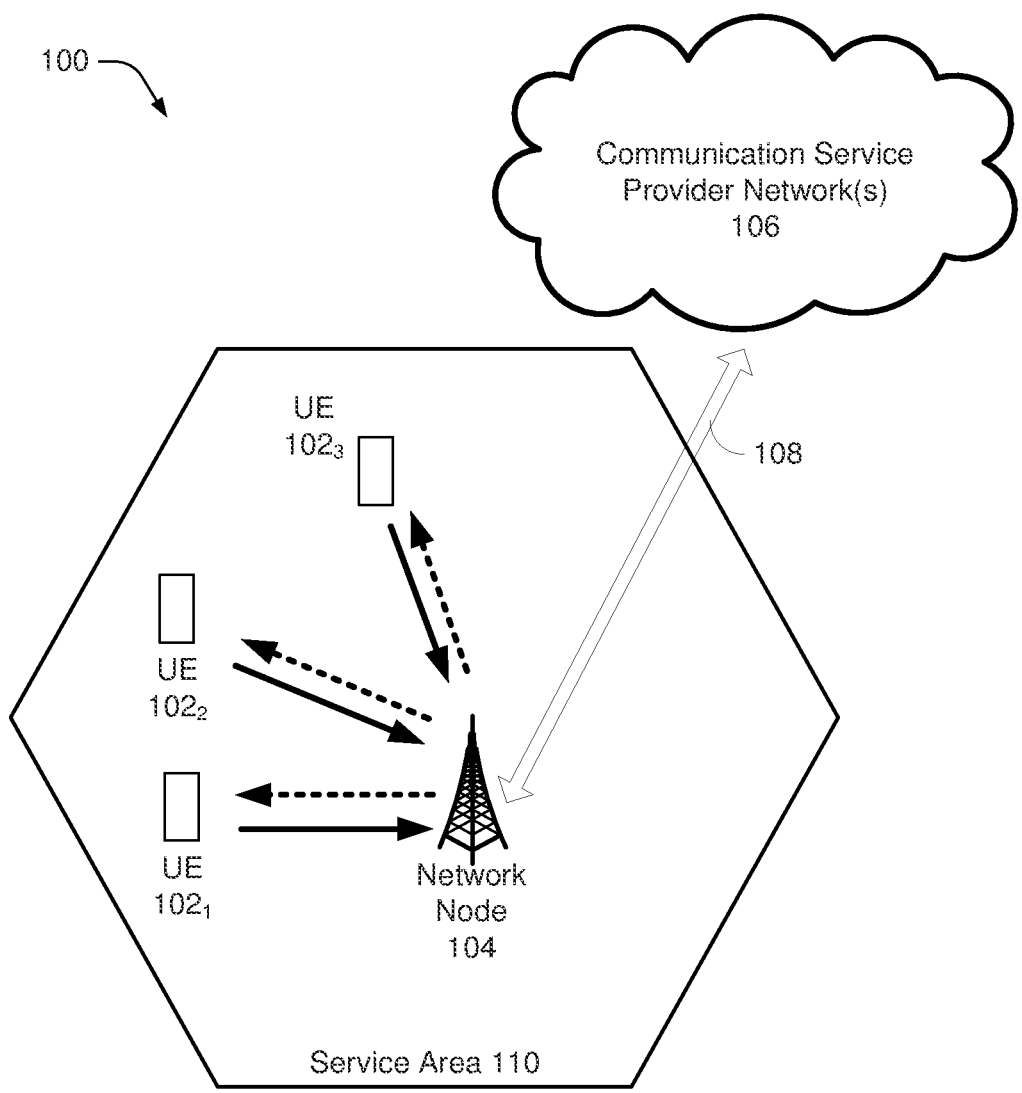
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards emotion detection and translation for electronic communications. An emotional state of a first communication participant can be detected, e.g., through face recognition, biometric information, and/or communication content analysis. The emotional state can be encoded in metadata that can accompany the communication content. The metadata can be translated into one or more embellishments that represent the emotional state, and the embellishments can be inserted into the communication content. The embellished communication content can then be delivered to a second communication participant. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs 102$_1$, 102$_2$, 102$_3$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have cabinets and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000, etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication parameters/characteristics of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
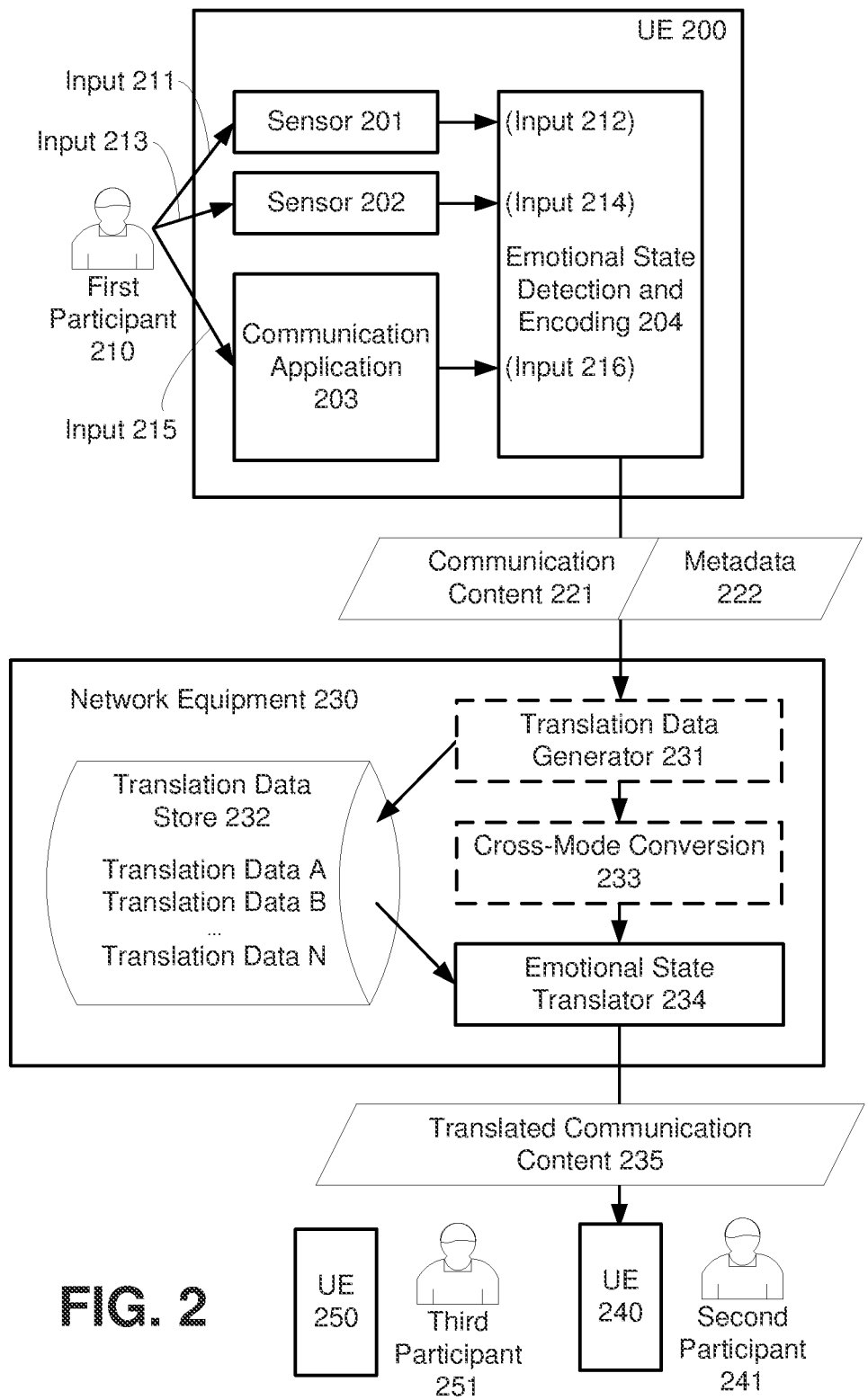
FIG. 2 illustrates an example system architecture of a system adapted to perform emotion detection and translation for electronic communications, in accordance with various aspects and embodiments of the subject disclosure.

FIG. 2 illustrates an example system architecture of a system adapted to perform emotion detection and translation for electronic communications, in accordance with various aspects and embodiments of the subject disclosure. FIG. 2 includes a UE 200 operated by a first participant 210, network equipment 230, a UE 240 operated by a second participant 241, and a UE 250 operated by a third participant 251. The UE 200 comprises a sensor 201, a sensor 202, a communication application 203, and emotional state detection and encoding 204. The network equipment 230 comprises translation data generator 231, translation data store 232, cross-mode conversion 233, and emotional state translator 234. The UEs 200, 240 and 250 in FIG. 2 can implement UEs 102 illustrated in FIG. 1, and the network equipment 230 can be included in the communication service provider network(s) illustrated in FIG. 1.

In an example according to FIG. 2, the first participant 210 can provide an input 215 to the UE 200, e.g., by typing a text message into an interface provided by the communication application 203. The input 215 can comprise communication content 221. The communication content 221 can be provided as an input 216 to the emotional state detection and encoding 204.

In response to receiving the input 216, emotional state detection and encoding 204 can assess an emotional state of the first participant 210, generate metadata 222 that identifies the emotional state of the first participant 210, and include the metadata 222 with the communication content 221, so that both the communication content 221 and the metadata 222 are sent, e.g., to the second and/or third participants 241, 251, via network equipment 230 and UEs 240, 250.

Emotional state detection and encoding 204 can use any of several approaches to detect the emotional state of the first participant 210. In some embodiments, the emotional state detection and encoding 204 can analyze the input 216/communication content 221, e.g., by analyzing the input 216, for language or other content associated with an emotional state. For example, language such as "I'm happy", or "I'm frustrated" can imply a corresponding emotional state of the first participant 210. The inclusion of certain images or "emojis" can also be used to infer emotional state. Audio content can be analyzed for tones, volume levels, and vocal patterns indicative of emotional state. Video content can be analyzed for facial expressions and body language indicative of emotional state.

In some embodiments, the emotional state detection and encoding 204 can analyze inputs 212 and/or 214 from sensors 201 and/or 202 in order to infer an emotional state of the first participant 210. For example, the sensor 201 may comprise a face recognition processing unit of the UE 200. A face recognition input 211 can be received at sensor 201 and provided as input 212 to the emotional state detection and encoding 204. The emotional state detection and encoding 204 can infer an emotional state from the input 212, e.g., via facial expression analysis. In another example, the sensor 202 may comprise a biometric sensor that senses, e.g., body temperature of the first participant 210, pupil dilation of the first participant 210, or any other biometric input 213. The biometric input 213 can be received at sensor 202 and provided as input 214 to the emotional state detection and encoding 204. The emotional state detection and encoding 204 can infer an emotional state from the input 213.

In some embodiments, the emotional state detection and encoding 204 can be configured to detect intensity of the emotional state of the first participant 210, in addition to detection of the emotional state itself. Emotional states can be associated with different intensity levels, e.g., level 1 being a mild intensity, level 2 being a medium intensity, and level 3 being a high intensity. The emotional state detection and encoding 204 can be configured to include emotional state identifications as well as intensity information in metadata 222. In a related embodiment, emotional states of different intensities can be identified differently, e.g., as, "content" versus "happy" versus "euphoric," without necessarily using intensity levels.

In some embodiments, the emotional state detection and encoding 204 can be configured to validate the detected emotional state of the first participant 210, e.g., via an interaction with the first participant 210. For example, the emotional state detection and encoding 204 can be configured to display a user interface on a display at the UE 200. The user interface can request first participant 210 confirmation of a detected emotional state, e.g., "Are you in a happy emotional state?" along with user interface buttons to confirm or deny.

Subsequent to detecting the emotional state of the first participant 210, emotional state detection and encoding 204 can be configured to identify metadata 222 that corresponds to the detected emotional state. Example metadata 222 can comprise, e.g., emotion identifiers such as "happy", "sad", "angry", "bored", etc. Metadata 222 can be selected from a library of metadata identifiers, so that emotional state identifiers in metadata 222 can be used consistently and recognized and processed by other equipment, e.g., by network equipment 230 and/or UEs 240, 241. Emotional state detection and encoding 204 can include, or else cause the communication application 203 or other functions of the UE 200 to include, the metadata 222 along with the communication content 221, so that the metadata 222 and the communication content 221 are sent together via a communication network comprising network equipment 230.

In addition to the emotional state detection and encoding operations described above, the architecture illustrated in FIG. 2 can be configured to translate the communication content 221 and metadata 222 into translated communication content 235. Network delivery components that deliver communications to target recipients can be configured to use the emotional state translator 234 to generate the translated communication content 235, and the translated communication content 235 can be delivered to applicable target recipients, e.g., to the second participant 241 and/or the third participant 251.

Figure 4:
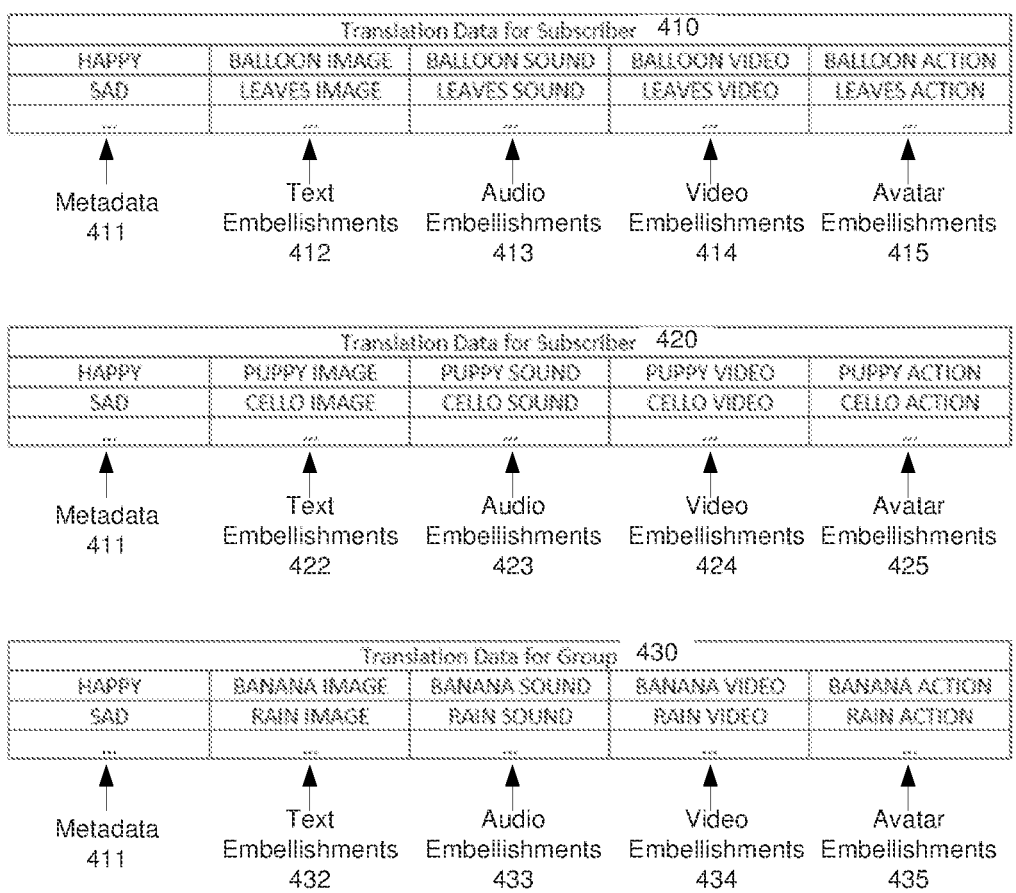
FIG. 4 illustrates example translation data, in accordance with various aspects and embodiments of the subject disclosure.

In order to convert communication content 221 and metadata 222 into translated communication content 235, the emotional state translator 234 can identify the target recipient(s) of the communication content 221. The emotional state translator 234 can then look up translation data associated with the target recipient(s) in the translation data store 232. Example translation data is illustrated in FIG. 4 and can comprise, e.g., metadata identifiers and corresponding respective embellishments.

The emotional state translator 234 can use translation data retrieved from the translation data store 232 by looking up the emotional state identifier(s) included in metadata 222 in the retrieved translation data. The emotional state translator 234 can identify embellishments that correspond to the emotional state identifier(s) in metadata 222. The identified embellishments can be inserted into or can otherwise be used to modify the communication content 221, resulting in translated communication content 235. The translated communication content 235 can be delivered to the target recipient(s), e.g., to the second participant 241 and/or the third participant 251.

In an example according to FIG. 2, communication content 221 can comprise, e.g., a text message sent to the second participant 241, and the metadata 222 can include an emotional state identifier, e.g., "happy." The emotional state translator 234 can look up translation data associated with the second participant 241 in the translation data store 232, thereby retrieving, e.g., translation data A. Translation data A can comprise, inter alia, embellishments to convey a "happy" emotional state to the second participant 241. An example embellishment can comprise, e.g., a puppy emoji. Translation data A can further comprise embellishments for use in conveying other emotional states to the second participant 241.

The emotional state translator 234 can use translation data A by looking up the "happy" metadata 222 in translation data A, and identifying the corresponding embellishments, e.g., the puppy emoji. The emotional state translator 234 can then insert the identified embellishment into the communication content 221 (a text message in this example), resulting in translated communication content 235. The translated communication content 235 can comprise, e.g., the original text of the communication content 221 plus the puppy emoji identified by the emotional state translator 234 using the metadata 222 and translation data A. The translated communication content 235 can be delivered to the target recipient(s), e.g., to the second participant 241 in this example.

In another example according to FIG. 2, communication content 221 can comprise, e.g., a text message sent to both the second participant 241 and the third participant 251, and the metadata 222 can again include an emotional state identifier, e.g., "happy." The emotional state translator 234 can look up translation data associated with a group comprising the first participant 210, the second participant 241, and the third participant 251 in the translation data store 232, thereby retrieving, e.g., translation data B. Translation data B can comprise, inter alia, embellishments to be used to convey a "happy" emotional state of to the group. An example embellishment can comprise, e.g., a banana emoji. Translation data B can further comprise embellishments for use in conveying other emotional states the group.

The emotional state translator 234 can use translation data B by looking up the "happy" metadata 222 in translation data B, and identifying the corresponding embellishments, e.g., the banana emoji. The emotional state translator 234 can then insert the identified embellishment into the communication content 221 (a text message in this example), resulting in translated communication content 235. The translated communication content 235 can comprise, e.g., the original text of the communication content 221 plus the banana emoji identified by the emotional state translator 234 using the metadata 222 and the translation data B. The translated communication content 235 can be delivered to the target recipient(s), e.g., to the second participant 241 and the third participant 251 in this example.

Some embodiments can further include a translation data generator 231. The translation data generator 231 can be configured to generate the translation data, such as translation data A and translation data B, which is stored in the translation data store 232 and used by the emotional state translator 234. In one example configuration, the translation data generator 231 can be configured to scan communications, e.g., communication content 221 and metadata 222, in order to identify embellishments included in the communication content 221 which can be extracted and stored in the translation data along with an association/relation to the metadata 222.

For example, if the metadata 222 identifies a "sarcastic" emotional state, and the communication content 221 includes a grinning face image, the translation data generator 231 can extract the grinning face image from the communication content 221 and store the grinning face image in the translation data store 232 as an embellishment for insertion in future "sarcastic" communications directed to the first participant 210.

In some embodiments, translation data generator 231 can apply machine learning to data including communication content and metadata from multiple different communications, in order to identify "best fit" embellishments for use in communicating different emotional states. Larger groups such as employees of a company, residents of a particular town, fans of a sport, etc., may share a cultural context that includes the use of particular embellishments to convey different emotional states, and the translation data generator 231 can be adapted to identify embellishments for such larger groups, or for smaller groups, or for specific individuals/communication participants.

Some embodiments can further include, or can be used in conjunction with, cross-mode conversion 233 which converts communication content 221 from one mode to another. For example, cross-mode conversion 233 can be adapted to convert a text message from text mode to audio mode, in which a voice reads the content of the text message. Other modes can include, e.g., video and augmented reality/virtual reality (AR/VR) modes. Video and AR/VR modes can include, e.g., avatars that interact via text or voice communications as well as body language and facial expressions.

In embodiments in which cross-mode conversion 233 converts communication content 221 from one mode to another, the translated communication content 235 can comprise a different mode than the communication content 221. For example, the translated communication content 235 can comprise an audio playback of text information in the communication content 221. The emotional state generator 234 can include a mode-appropriate embellishment in the translated communication content 235. For example, instead of including a banana image embellishment in a text message, the emotional state generator 234 can include a splat or slipping sound in translated communication content 235 comprising an audio playback. The translation data, e.g., translation data A, can include embellishments for use in connection expressing emotional states in different communication modes.

Figure 3:
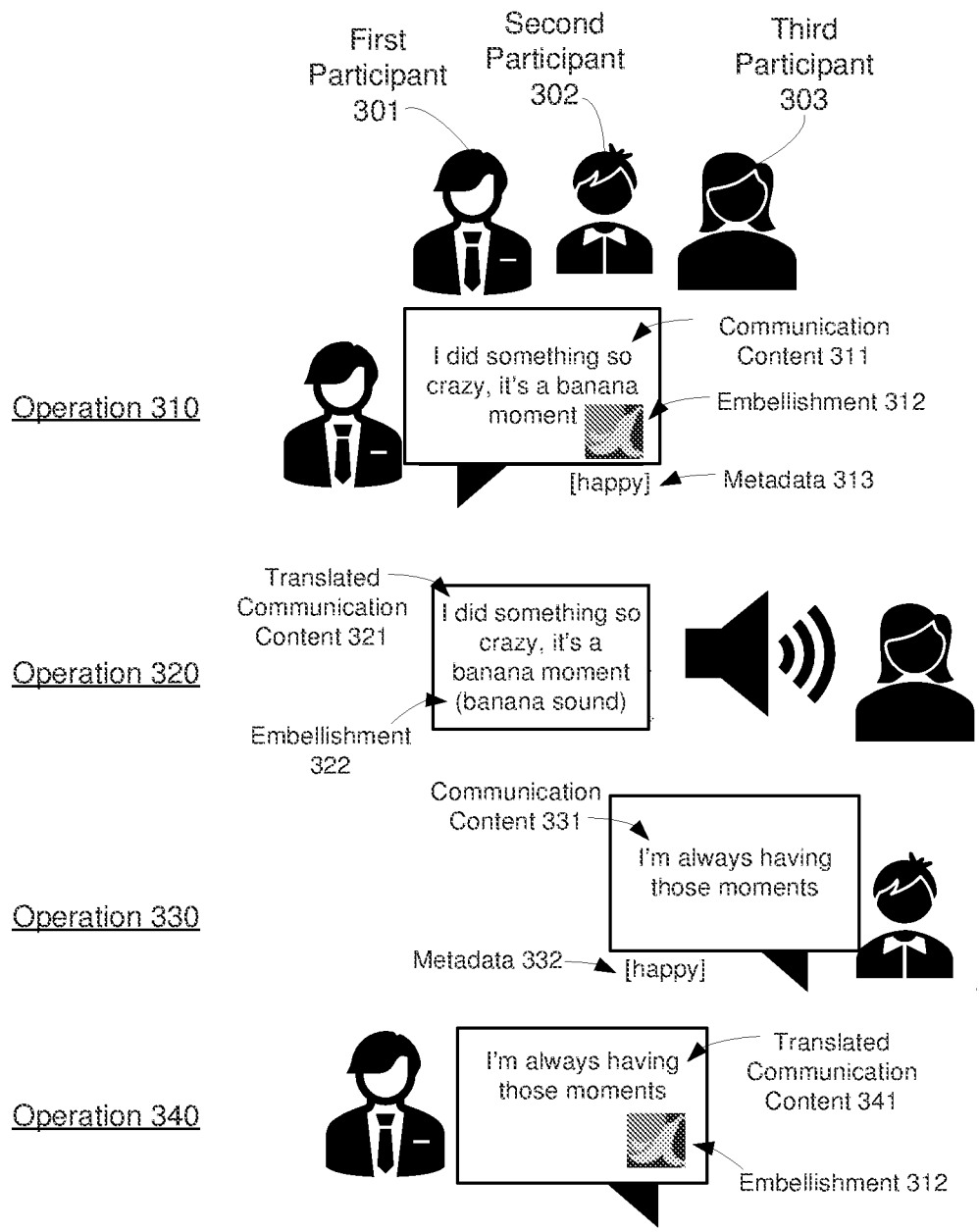
FIG. 3 illustrates an example sequence of interactions between communication participants and corresponding operations of a system, in accordance with various aspects and embodiments of the subject disclosure.

FIG. 3 illustrates an example sequence of interactions between communication participants and corresponding operations of a system, in accordance with various aspects and embodiments of the subject disclosure. FIG. 3 illustrates interactions between three example communication participants, a first participant 301, a second participant 302, and a third participant 303. FIG. 3 furthermore illustrates an operation 310, an operation 320, an operation 330, and an operation 340.

At operation 310, the first participant 301 sends a communication content 311 to the second participant 302 and the third participant 303. The communication content 311 comprises an embellishment 312. A system such as illustrated in FIG. 2 can apply emotional state detection and encoding 204 to detect that the first participant 301 is "happy" and can therefore link metadata 313 to the communication content 311, wherein the metadata 313 identifies the "happy" emotional state.

At operation 320, the network equipment 230 can convert the communication content 311 into translated communication content 321 for the third participant 303. In the illustrated example, the translated communication content 321 comprises an audio playback of the communication content 311, along with an embellishment 322 comprising a banana sound, e.g., a splat or a slipping sound.

In order to perform operation 320, a translation data generator 231 can optionally generate translation data for the group including first participant 301, second participant 302, and third participant 303. The communication content 311 can be used to generate the translation data for the group. The embellishment 312 can be associated with a happy emotional state, and other embellishments, such as embellishment 322, can be derived from embellishment 312 for use in connection with other communication modes. If the second participant 302 is in a same communication mode as the first participant 301, the network equipment 320 can deliver the communication content 311 and embellishment 313 to the second participant 302.

At operation 330, the second participant 302 sends communication content 331 to the group. The communication content 331 does not include any embellishments. An emotional state of the second participant 302 can be detected, e.g., from analysis of the communication content 331, or from biometric inputs from second participant 302, or for example using machine learning to estimate a most likely emotional state of the second participant 302 in connection with the illustrated conversation with the group of participants. In FIG. 3, the emotional state of the second participant 302 is detected to be "happy" and metadata 332 identifying the happy emotional state is linked to the communication content 331.

At operation 340, translated communication content 341 comprising embellishment 312 is delivered to the group, and the delivery to the first participant 301 is illustrated. The translated communication content 341 has been modified by the inclusion of embellishment 312 which conveys the emotional state of the second participant 302 to the first participant 301. In order to perform operation 340, the emotional state translator 234 can look up the embellishment 312 which is linked to the metadata 332 in previously stored translation data for the group. The communication content 331 can be modified by including the embellishment 312 therein, thereby producing translated communication content 341.

FIG. 4 illustrates example translation data, in accordance with various aspects and embodiments of the subject disclosure. FIG. 4 includes example translation data for subscriber 410, example translation data for subscriber 420, and example translation data for group 430.

The example translation data for subscriber 410 can be used, e.g., to identify embellishments for inclusion in communications directed at a first subscriber. The example translation data for subscriber 410 includes metadata 411, which lists different emotional state identifiers such as "happy", "sad", etc. When a communication indicates the sender is "happy", the embellishments for "happy" can be inserted in the communication, when a communication indicates the sender is "sad", the embellishments for "sad" can be inserted in the communication, and likewise for other emotional states included in the translation data for subscriber 410. The example translation data for subscriber 410 includes embellishments for use in different communication modes. Text embellishments 412 can be used in connection with text communication mode communications. Text-based embellishments may be modifications of the communication text or dialog between one or more subscribers. For example, one embellishment may modify the font or color of a content to indicate a more celebratory mood (e.g., using pink and yellow San Serif) or a professional mood (e.g., using black and grey bold Calligraphy) to match moods around a happy birthday conveyance or graduation conveyance respectively. Audio embellishments 413 can be used in connection with audio communication mode communications. Audio embellishments may include the inclusion of sounds, themed music, and specific phrases or utterances from user-generated content or celebrity content. Video embellishments 414 can be used in connection with video communication mode communications. Examples of video embellishments by the change of an image, shape of an object, animation of objects, or overlay of other audio-visual content into the original content. Avatar embellishments 415 can be used in connection with AR/VR communication mode communications. Avatar embellishments may include certain actions to be executed or articulated by one or more avatars in the content. Such actions (e.g. a belly-shaking laugh) may be translated to avatars of human (e.g. faces) and non-human (e.g. trees, houses, etc.) avatars as determined by the capabilities of the communication playback device and the original avatar configurations.

The example translation data for subscriber 420 can be used, e.g., to identify embellishments for inclusion in communications directed at a second subscriber 420. The example translation data for subscriber 420 includes metadata 411, which lists the emotional state identifiers such as "happy", "sad", etc. When a communication indicates the sender is "happy", the embellishments for "happy" can be inserted in the communication, when a communication indicates the sender is "sad", the embellishments for "sad" can be inserted in the communication, and likewise for other emotional states included in the translation data for subscriber 420. As can be seen in FIG. 4, the text embellishments 422, audio embellishments 423, video embellishments 424, and avatar embellishments 425 are different from the corresponding embellishments in the translation data for subscriber 410. For example, a balloon image is used in text embellishments 412, while a puppy image is used in text embellishments 422. Different embellishments can be used to convey emotional state to different subscribers.

The example translation data for group 430 can be used, e.g., to identify embellishments for inclusion in communications directed at a group of subscribers. The example translation data for group 430 includes metadata 411, which lists the emotional state identifiers such as "happy", "sad", etc. When a communication is indicates the sender is "happy", the embellishments for "happy" can be inserted in the communication, when a communication indicates the sender is "sad", the embellishments for "sad" can be inserted in the communication, and likewise for other emotional states included in the translation data for group 430. As can be seen in FIG. 4, the text embellishments 432, audio embellishments 433, video embellishments 434, and avatar embellishments 435 are different from the corresponding embellishments in the translation data for subscriber 410 and the translation data for subscriber 420. For example, a balloon image is used in text embellishments 412, while a banana image is used in text embellishments 432. Different embellishments can be used to convey a sender's emotional state to a group than to an individual subscriber. Thus, for example, translation data for subscriber 410 can be used for communications directed only to the first subscriber, while translation data for group 430 can be used for communications directed at a group comprising the first subscriber.

Figure 5:
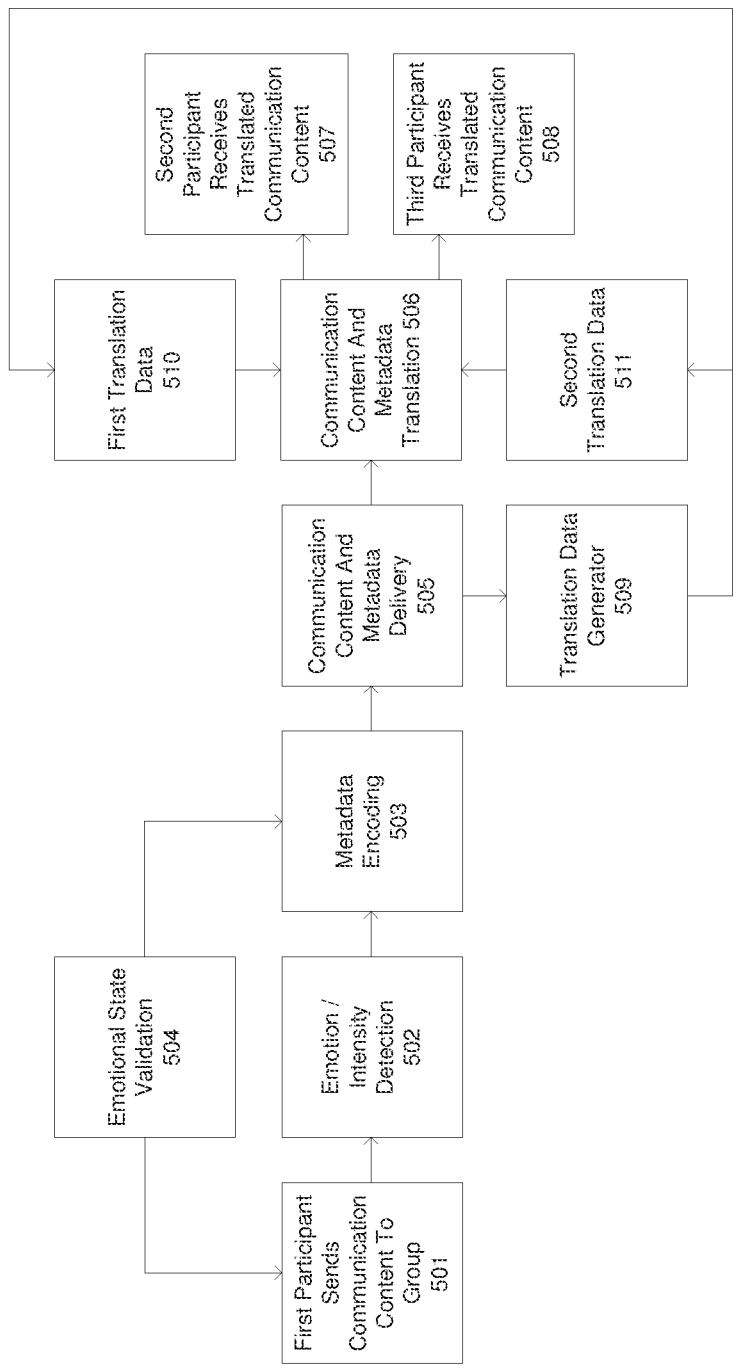
FIG. 5 illustrates example system components and corresponding operations of a system adapted to perform emotion detection and translation for electronic communications, in accordance with various aspects and embodiments of the subject disclosure.

FIG. 5 illustrates example system components and corresponding operations of a system adapted to perform emotion detection and translation for electronic communications, in accordance with various aspects and embodiments of the subject disclosure. FIG. 5 includes "first participant sends communication content to group" 501, "emotion/intensity detection" 502, "metadata encoding" 503, "emotional state validation" 504, "communication content and metadata delivery" 505, "communication content and metadata translation" 506, "second participant receives translated communication content" 507, "third participant receives translated communication content" 508, "translation data generator" 509, "first translation data" 510, and "second translation data" 511.

In an example according to FIG. 5, at 501, a sender (e.g., a first participant) starts to send communication content to a messaging group. At 502, the system detects an emotional state of the first participant. Detection can be performed, e.g., by biometrics on a device, or based on context, or from an input received from the first participant. The detected emotional state can be stored for later emotional state detection operations.

At 503, metadata identifying the detected emotional state can be encoded in the communication content before the communication content is distributed to other communication participants. At 504, optionally, before the communication content is distributed, the system may send feedback to the first participant to validate the identified emotional state. If the first participant ignores the feedback, the system can proceed, using the detected/unvalidated emotional state.

At 505, the system distributes an augmented message comprising communication content and metadata through traditional network channels. At 506, upon receipt by network equipment or user equipment of the target recipients, a broker system can analyze the metadata and communication content, before delivery to the target recipients. The broker system can translate the communication content based on differentiated translation data which can be differentiated for different recipients and/or groups.

At 507 and 508, the system delivers translated communication content to the recipients, namely the second participant and the third participant. The translated communication content may be same or different for the different recipients, depending on whether unified group translation data is used. In some embodiments, metadata and/or embellishments that came from the first participant can be included in translated communication content delivered to the second and third participants. In some embodiments, a context of a conversation can be monitored by the broker system such that it can augment one or more messages in the conversation. In some embodiments, a context of each participant can be independently monitored and either kept locally or shared to a central broker system. In still further embodiments, a historical profile can be stored for each participant and used in connection with generating the participant's translation data.

At operation 509, in some embodiments, the system can continuously monitor conversations and store embellishments and emotional state metadata tuples, while using stored tuples to negotiate or converge on common embellishments. During conversation monitoring, recurring embellishments and emotional states can be identified and stored as translation data 510, 511. Participant profiles, emotional states, interactions, and embellishments can be stored for future use in machine learning detection of emotional states and embellishment identification.

Figure 6A:
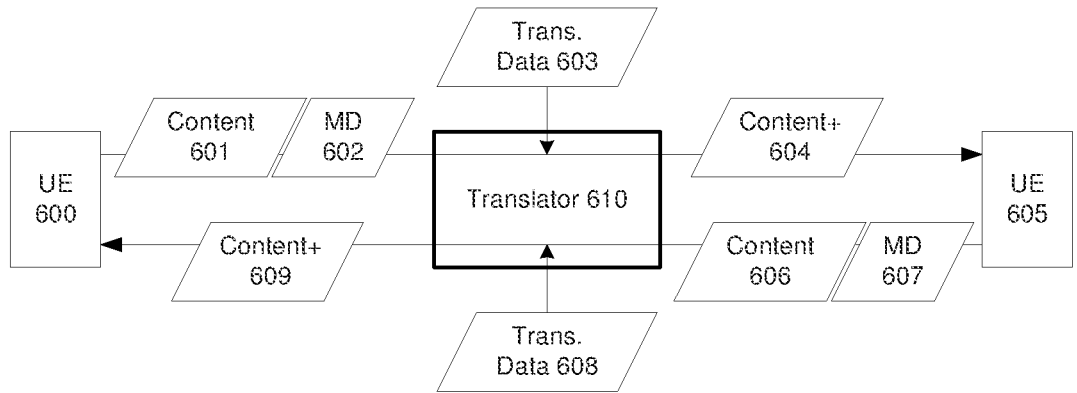
FIG. 6A illustrates processing of a first example interaction between communication participants, in accordance with various aspects and embodiments of the subject disclosure.

FIG. 6A illustrates processing of a first example interaction between communication participants, in accordance with various aspects and embodiments of the subject disclosure. FIG. 6A includes UE 600, content 601, metadata 602, translation data 603, content+ 604, UE 605, content 606, metadata 607, translation data 608, content+ 609, and translator 610.

In FIG. 6A, the UE 600 can comprise a UE operated by a first participant, the content 601 can comprise communication content sent from the UE 600 and directed toward a second participant associated with the UE 605, the metadata 602 can encode a detected emotional state of the first participant, the translation data 603 can comprise translation data for use in translating communication content directed to the second participant at UE 605, and the content+ 604 can comprise translated communication content, as translated by translator 610 based on the content 601, the metadata 602, and the translation data 603.

Furthermore, the content 606 can comprise communication content sent from the UE 605 and directed toward the first participant associated with the UE 600, the metadata 607 can encode a detected emotional state of the second participant, the translation data 608 can comprise translation data for use in translating communication content directed to the first participant at UE 600, and the content+ 609 can comprise translated communication content, as translated by translator 610 based on the content 606, the metadata 607, and the translation data 608.

FIG. 6A illustrates an example communication between two participants and application of different translation data 603, 608 to convey emotional state information to each of the participants. The translator 610 can be implemented at network equipment 230 as illustrated in FIG. 2, or at either or both UEs 600, 605. Furthermore, the translator 610 can optionally include additional features and functions, such as those illustrated in connection with the network equipment 230 illustrated in FIG. 2.

Figure 6B:
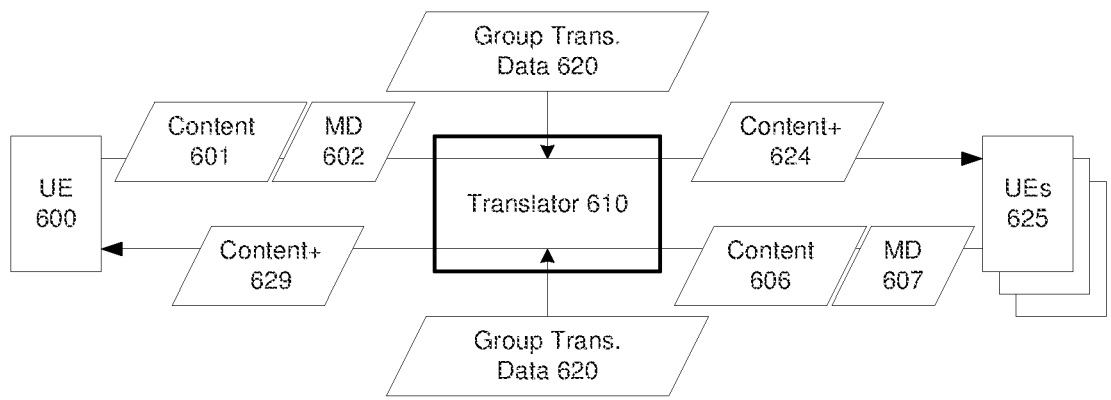
FIG. 6B illustrates processing of a second example interaction between communication participants, in accordance with various aspects and embodiments of the subject disclosure.

FIG. 6B illustrates processing of a second example interaction between communication participants, in accordance with various aspects and embodiments of the subject disclosure. FIG. 6B includes UE 600, content 601, metadata 602, group translation data 620, content+ 624, UEs 625, content 606, metadata 607, another instance of group translation data 620, content+ 629, and translator 610.

FIG. 6B illustrates operations in connection with communications between a group of participants comprising the first participant at UE 600 and multiple other participants at UEs 625. In FIG. 6B, the content 601 can comprise communication content sent from the UE 600 and directed toward other participants associated with the UEs 625. The metadata 602 can encode a detected emotional state of the first participant. The group translation data 620 can comprise translation data for use in translating, e.g., any communication content shared between the group. The content+ 624 can comprise translated communication content, as translated by translator 610 based on the content 601, the metadata 602, and the group translation data 620.

Furthermore, the content 606 can comprise communication content sent from any of the UEs 625 and directed toward the first participant associated with the UE 600, as well as the other UEs of UEs 625. The metadata 607 can encode a detected emotional state of the sending participant. The content+ 629 can comprise translated communication content, as translated by translator 610 based on the content 606, the metadata 607, and the group translation data 620. FIG. 6B illustrates an example communication between a group of participants and application of same group translation data 620 to convey emotional state information to the group.

Figure 6C:
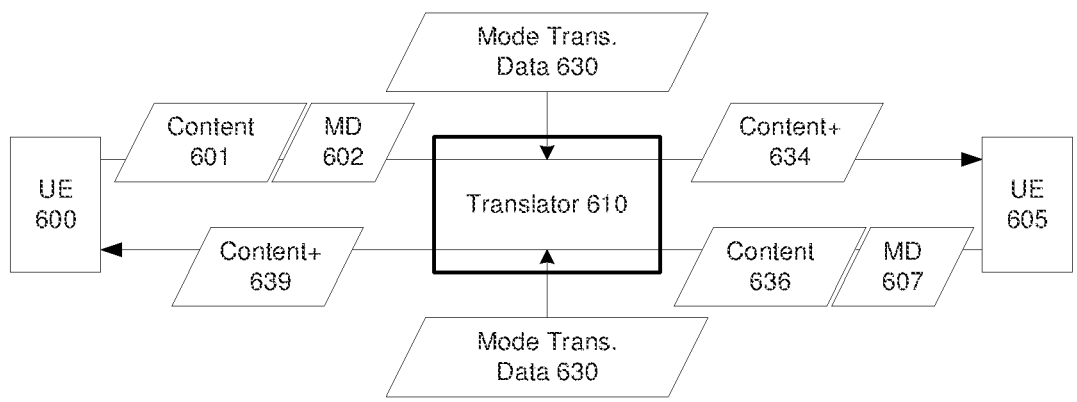
FIG. 6C illustrates processing of a third example interaction between communication participants, in accordance with various aspects and embodiments of the subject disclosure.

FIG. 6C illustrates processing of a third example interaction between communication participants, in accordance with various aspects and embodiments of the subject disclosure. FIG. 6C includes UE 600, content 601, metadata 602, mode translation data 630, content+ 634, UE 605, content 636, metadata 607, another instance of mode translation data 630, content+ 639, and translator 610.

FIG. 6C illustrates operations in connection with cross-modal communications between the first participant at UE 600 and the second participant at UE 605. In FIG. 6C, the content 601 can comprise communication content associated with a first communication mode, e.g., a text mode, an audio mode, a video mode, or an AR/VR mode, and sent from the UE 600 and directed toward the second participant associated with the UE 605. The metadata 602 can encode a detected emotional state of the first participant. The mode translation data 630 can comprise translation data for use in translating communication content from the first communication mode to a second communication mode employed by the second participant at UE 605. The content+ 634 can comprise translated communication content, as translated by translator 610 based on the content 601, the metadata 602, and the mode translation data 603. The translator 610 can include in the content+ 634 embellishments that are based on the emotional state encoded in metadata 602 and are also appropriate for the communication mode employed by UE 605.

Furthermore, the content 636 can comprise communication content associated with the second communication mode, e.g., a text mode, an audio mode, a video mode, or an AR/VR mode, sent from the UE 605 and directed toward the first participant associated with the UE 600. The metadata 607 can encode a detected emotional state of the second participant. The mode translation data 630 can comprise translation data for use in translating communication content from the second communication mode to the first communication mode employed by the first participant at UE 600. The content+ 639 can comprise translated communication content, as translated by translator 610 based on the content 636, the metadata 607, and the mode translation data 630. The translator 610 can include in the content+ 639, embellishments based on the emotional state encoded in metadata 607 and which are also appropriate for the communication mode employed by UE 600.

FIG. 6C illustrates an example cross-modal communication between two participants and application of mode translation data 630 to translate communication content and/or emotional state metadata between the different communication modes. Numerous other examples and communication scenarios, similar to those illustrated in FIGS. 6A, 6B, and 6C, can be enabled by embodiments of this disclosure and this disclosure is therefore not limited to support for the illustrated example communications.

Figure 7:
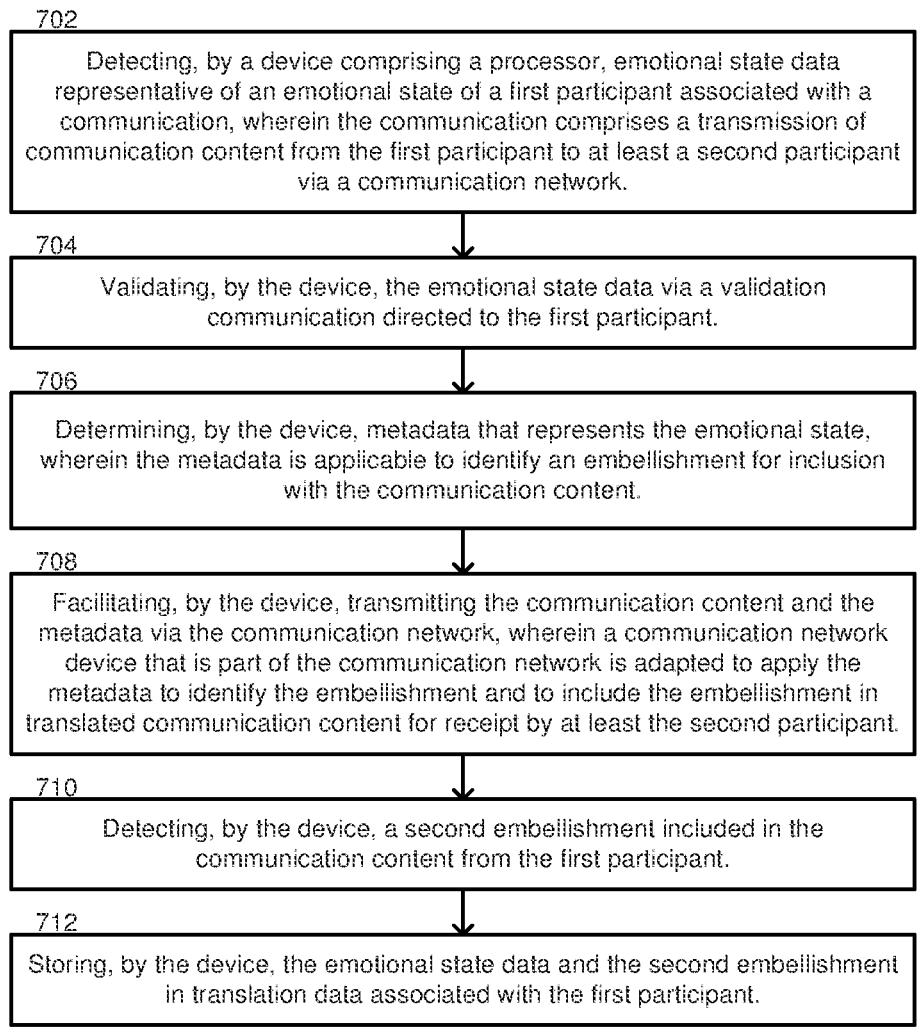
FIG. 7 is a flow diagram representing example operations to determine emotional state metadata for inclusion in electronic communications, in accordance with various aspects and embodiments of the subject disclosure.

FIG. 7 is a flow diagram representing example operations to determine emotional state metadata for inclusion in electronic communications, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by user equipment, e.g., UE 200 associated with a first participant 210 identity, illustrated in FIG. 2. Example operation 702 comprises detecting, by a device 200 comprising a processor, emotional state data, e.g., inputs 212, 214 and/or 216 representative of an emotional state of a first participant 210 associated with a communication, wherein the communication comprises a transmission of communication content 221 from the first participant 210 to at least a second participant 241 via a communication network. Detecting the emotional state data can comprise, e.g., processing a biometric or face recognition input received via sensors 201, 202, or analyzing the communication content 216 or 221, or applying a machine learning process to determine emotional state based on collected data and/or communication history. In some embodiments, detecting the emotional state data can comprise detecting an intensity level of the emotional state. Example operation 704 comprises optionally validating, by the device 200, the emotional state data via a validation communication directed to the first participant 210.

Example operation 706 comprises determining, by the device 200, metadata 222 that represents the emotional state, wherein the metadata 222 is applicable to identify an embellishment for inclusion with the communication content 221. Metadata 222 can encode an emotional state identifier such as "happy", "sad", "bored", etc. In some embodiments, the metadata 222 can represent the emotional state and the intensity level of the emotional state.

Example operation 708 comprises facilitating, by the device 200, transmitting the communication content 221 and the metadata 222 via the communication network, wherein a communication network device, e.g., network equipment 230, is adapted to apply the metadata 222 to identify the embellishment and to include the embellishment in translated communication content 235 for receipt by at least the second participant 241. In one embodiment, the embellishment can be applied to create a translated communication content 235 with authenticity to the emotional state conveyed by the content 221 or its accompanying metadata 222. In another embodiment, an emotional state of the second participant 241 can also be considered before the translated content 235 is created, such that the intensity of a translation or embellishment is modified or nullified in an attempt to avoid frustration by the second participant 241 caused by a mood disparity. For example, if the second participant 241 is in a sad mood and an embellishment is meant to convey a happy mood, the system may nullify the embellishment. In another example, if both the second participant 241 and the first participant 210 are in a happy mood, the chosen embellishment may be translated by an amplified signal (e.g. a very happy or whimsical mood) during creation of the translated content 235.

In some embodiments the embellishment included in translated communication content 235 can be a first embellishment and identifying the first embellishment at operation 708 can comprise using first translation data, e.g., translation data A, to translate between the metadata 222 and the first embellishment. The first translation data (translation data A) can be different from second translation data (translation data B), other than the first translation data. The second translation data (translation data B) can be applicable to identifying second embellishments for a third participant 251 other than the first participant 210 and the second participant 241.

In some embodiments, the second participant 241 can include a group of second participants and identifying the embellishment at operation 708 can comprise using group translation data to translate between the metadata 222 and the embellishment. The group translation data can be generated, e.g., based on historical communications among the first participant 210 and the group of second participants 241.

In some embodiments, the translated communication content 235 can comprise cross-modal communication content comprising a second communication mode, e.g., audio, that is different from a first communication mode, e.g., text, associated with the communication content 221.

The embellishment identified at operation 708 can comprise a first embellishment, and operations of FIG. 7 can further include operations to generate translation data, such as operations 710 and 712. Operation 710 comprises detecting, by the device 200, a second embellishment included in the communication content 210 from the first participant 210. Operation 712 comprises storing, by the device 200, the emotional state data and the second embellishment in translation data 232 associated with the first participant 210, wherein the translation data 232 associated with the first participant 210 is applicable to identify future embellishments for inclusion in future translated communication content directed to the first participant 210.

Figure 8:
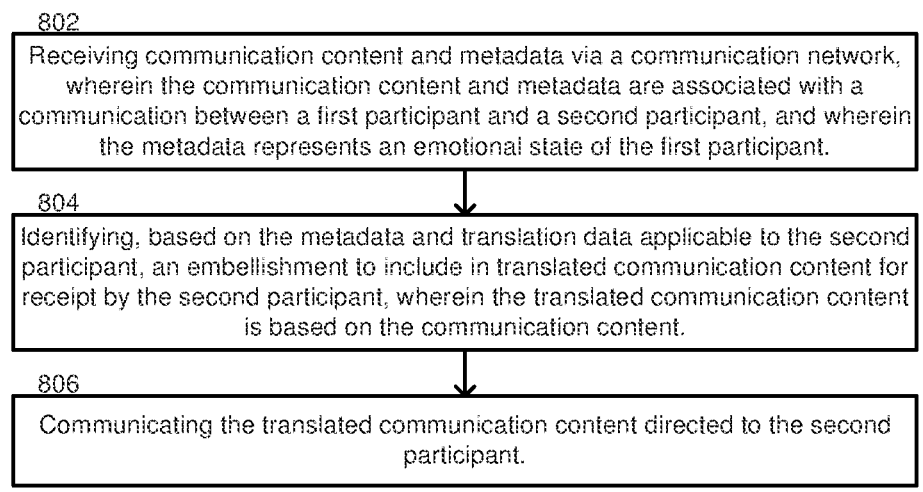
FIG. 8 is a flow diagram representing example operations to identify embellishments based on emotional state metadata and include the embellishments in translated communication content, in accordance with various aspects and embodiments of the subject disclosure.

FIG. 8 is a flow diagram representing example operations to identify embellishments based on emotional state metadata and include the embellishments in translated communication content, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

In some embodiments, the operations illustrated in FIG. 8 can be performed, for example, by network equipment, e.g., the network equipment 230 illustrated in FIG. 2. In other embodiments, the operations illustrated in FIG. 8 can be performed user equipment, e.g., by UE 240 operated by a second participant 241. Example operation 802 comprises receiving communication content 221 and metadata 222 via a communication network, wherein the communication content 221 and metadata 222 are associated with a communication between a first participant 210 and a second participant 241, and wherein the metadata 222 represents an emotional state of the first participant 210. The metadata 222 can optionally further represent an intensity level of the emotional state.

Example operation 804 comprises identifying, based on the metadata 222 and translation data applicable to the second participant 241, e.g., translation data A, an embellishment to include in translated communication content 235 for receipt by the second participant 241, wherein the translated communication content 235 is based on the communication content 221. The translated communication content 235 can optionally comprise cross-modal communication content having a second communication mode, e.g., audio, that is different from a first communication mode, e.g., text, associated with the communication content 221.

In some embodiments, the embellishment identified at operation 804 can comprise a first embellishment and the translation data, e.g., translation data A, can be first translation data different from second translation data, e.g., translation data B. The second translation data (translation data B) can be applicable to identifying a second embellishment for a third participant 251 other than the first participant 210 and the second participant 241.

Example operation 806 comprises communicating the translated communication content 235 directed to the second participant 241. In embodiments wherein network equipment 230 performs the operations of FIG. 8, operation 806 can comprise sending the translated communication content 235 to the UE 240. In embodiments wherein a UE 240 performs the operations of FIG. 8, operation 806 can comprise, e.g., displaying the translated communication content 235 at the UE 240.

Figure 9:
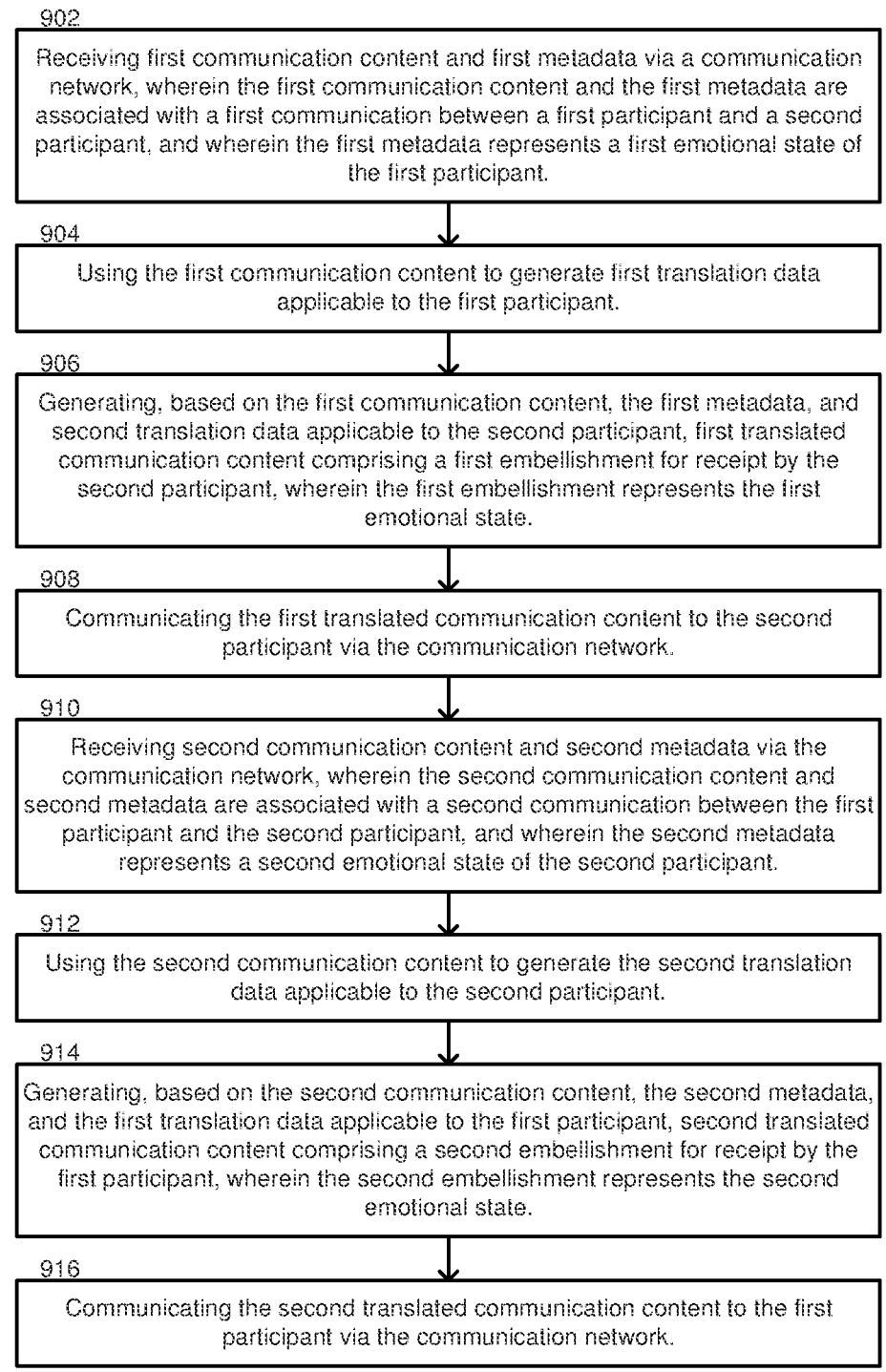
FIG. 9 is a flow diagram representing example operations to use emotional state metadata to modify communications between a first participant and a second participant, in accordance with various aspects and embodiments of the subject disclosure.

FIG. 9 is a flow diagram representing example operations to use emotional state metadata to modify communications between a first participant and a second participant, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by network equipment, e.g., core network equipment coupled with a cellular communication network and comprising a translator 610 such as illustrated in FIG. 6A. Operations 902-908 pertain to translation and delivery of first communication content 601 from the first participant (at UE 600) to the second participant (at UE 605). Example operation 902 comprises receiving first communication content 601 and first metadata 602 via a communication network, wherein the first communication content 601 and the first metadata 602 are associated with a first communication between a first participant (at UE 600) and a second participant (at UE 605), and wherein the first metadata 602 represents a first emotional state of the first participant (at UE 600).

Example operation 904 comprises using the first communication content 601 to generate first translation data 608 applicable to the first participant (at UE 600), such as by employing a translation data generator 231 illustrated in FIG. 2.

Example operation 906 comprises generating, based on the first communication content 601, the first metadata 602, and second translation data 603 applicable to the second participant (at UE 605), first translated communication content 604 comprising a first embellishment for receipt by the second participant (at UE 605), wherein the first embellishment represents the first emotional state, namely, the emotional state of the first participant (at UE 600). Example operation 908 comprises communicating the first translated communication content 604 to the second participant (at UE 605) via the communication network.

Operations 910-916 pertain to translation and delivery of second communication content 606 from the second participant (at UE 605) to the first participant (at UE 600). Example operation 910 comprises receiving second communication content 606 and second metadata 607 via the communication network, wherein the second communication content 606 and second metadata 607 are associated with a second communication between the first participant (at UE 600) and the second participant (at UE 605), and wherein the second metadata 607 represents a second emotional state of the second participant (at UE 605).

Example operation 912 comprises using the second communication content 606 to generate the second translation data 603 applicable to the second participant (at UE 605), such as by employing a translation data generator 231 illustrated in FIG. 2.

Example operation 914 comprises generating, based on the second communication content 606, the second metadata 607, and the first translation data 608 applicable to the first participant (at UE 600), second translated communication content 609 comprising a second embellishment for receipt by the first participant (at UE 600), wherein the second embellishment represents the second emotional state, namely, the emotional state of the second participant (at UE 605). Example operation 916 comprises communicating the second translated communication content 609 to the first participant (at UE 600) via the communication network.

In some embodiments, the first translated communication content 604 can be associated with a first communication mode, e.g., text, audio, video, etc., that is different from a second communication mode (text, audio, image, video, etc.) associated with the second translated communication content 609. Such an embodiment is further described in connection with FIG. 6C. An image communication mode can comprise e.g., images, videos or AR/VR type communications modes.

Figure 10:
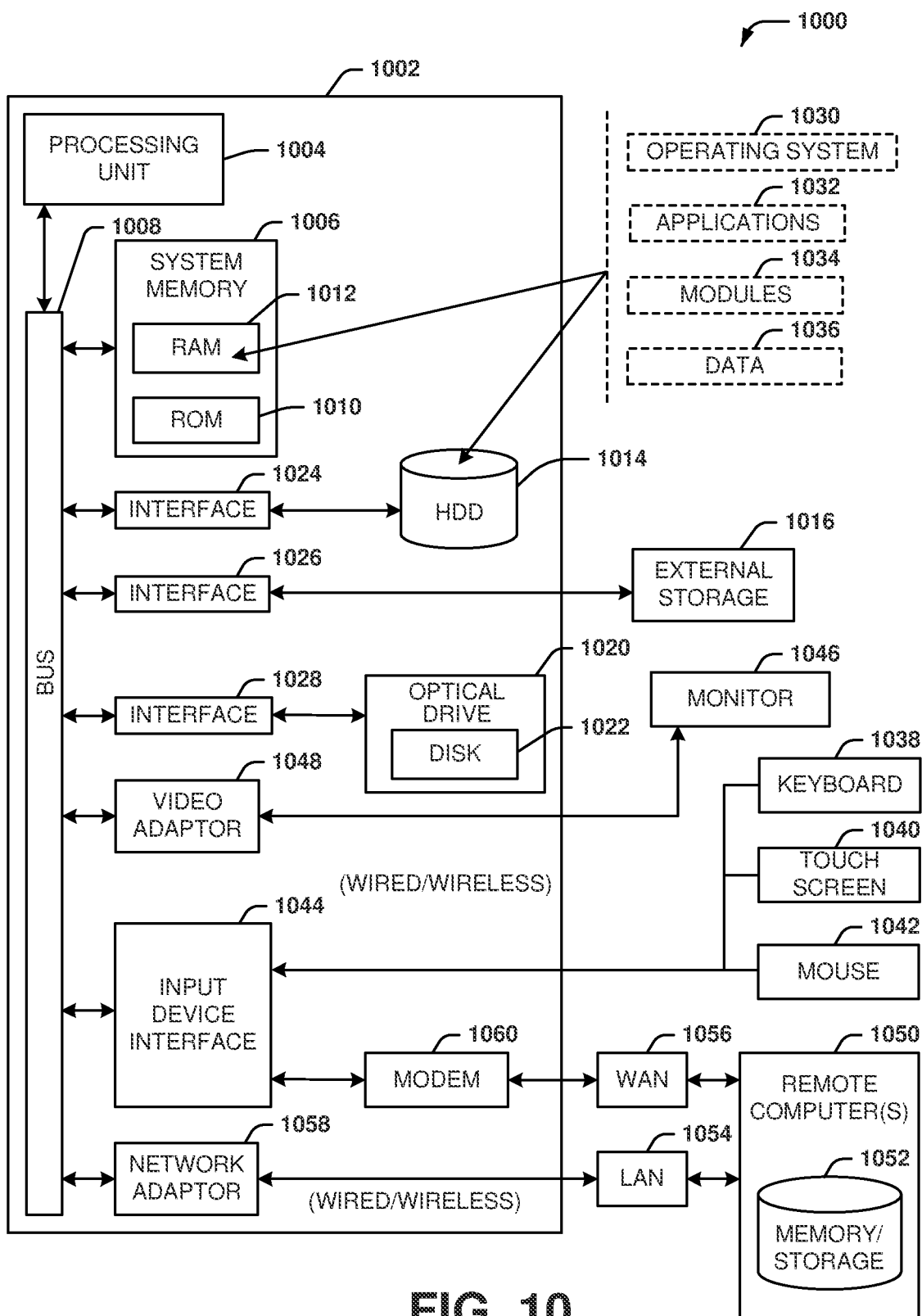
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-Ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown).

Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   detecting, by a device comprising a processor, emotional state data representative of an emotional state of a first participant associated with a communication, wherein the communication comprises a transmission of communication content from the first participant to at least a second participant via a communication network, wherein the transmission of the communication content is susceptible to miscommunication or misinterpretation of the emotional state of the first participant;
   determining, by the device, metadata that represents the emotional state, wherein the metadata is applicable to identify an embellishment for inclusion with the communication content, including translating between the metadata and the embellishment; and
   facilitating, by the device, transmitting the communication content and the metadata via the communication network, wherein a communication network device that is part of the communication network is adapted to apply the metadata to identify the embellishment and to include the embellishment in translated communication content for receipt by at least the second participant, the embellishment operative to represent the emotional state of the first participant to the second participant.

2. The method of claim 1, wherein detecting the emotional state data comprises processing a biometric input.

3. The method of claim 1, wherein detecting the emotional state data comprises analyzing the communication content.

4. The method of claim 1, wherein detecting the emotional state data comprises detecting an intensity level of the emotional state, and wherein the metadata represents the emotional state and the intensity level of the emotional state.

5. The method of claim 1, wherein the device is a user equipment associated with a first participant identity of the first participant.

6. The method of claim 1, further comprising validating, by the device, the emotional state data via a validation communication directed to the first participant.

7. The method of claim 1, wherein the embellishment is a first embellishment, wherein identifying the first embellishment comprises using first translation data to translate between the metadata and the first embellishment, and wherein the first translation data is different from second translation data, other than the first translation data, wherein the second translation data is applicable to identifying second embellishments for a third participant other than the first participant and the second participant.

8. The method of claim 1, wherein the second participant includes a group of second participants, and wherein identifying the embellishment comprises using group translation data to translate between the metadata and the embellishment, and wherein the group translation data is generated based on historical communications among the first participant and the group of second participants.

9. The method of claim 1, wherein the embellishment comprises a first embellishment, and further comprising detecting, by the device, a second embellishment included in the communication content from the first participant, and storing, by the device, the emotional state data and the second embellishment in translation data associated with the first participant, wherein the translation data associated with the first participant is applicable to identify future embellishments for inclusion in future translated communication content directed to the first participant.

10. The method of claim 1, wherein the translated communication content comprises cross-modal communication content comprising a second communication mode that is different from a first communication mode associated with the communication content.

11. Network equipment, comprising:
    a processor; and
    a memory that stores executable instructions that, when executed by the processor, facilitate performance of operations, comprising:
    receiving communication content and metadata via a communication network, wherein the communication content and metadata are associated with a communication between a first participant and a second participant, and wherein the metadata represents an emotional state of the first participant, and wherein the receiving the communication content is susceptible to miscommunication or misinterpretation of the emotional state of the first participant;
    identifying, based on the metadata and translation data applicable to the second participant, an embellishment to include in translated communication content for receipt by the second participant, wherein the translated communication content is based on the communication content, wherein the embellishment is operative to represent the emotional state of the first participant to the second participant; and
    communicating the translated communication content directed to the second participant.

12. The network equipment of claim 11, wherein the metadata further represents an intensity level of the emotional state.

13. The network equipment of claim 11, wherein the network equipment comprises a user equipment operated by the second participant.

14. The network equipment of claim 11, wherein the embellishment is a first embellishment, wherein the translation data is first translation data different from second translation data, other than the translation data, and wherein the second translation data is applicable to identifying a second embellishment for a third participant other than the first participant and the second participant.

15. The network equipment of claim 11, wherein the translated communication content comprises cross-modal communication content comprising a second communication mode that is different from a first communication mode associated with the communication content.

16. A non-transitory machine-readable medium, comprising executable instructions that, when executed by a processor, facilitate performance of operations, comprising:
receiving first communication content and first metadata via a communication network, wherein the first communication content and the first metadata are associated with a first communication between a first participant and a second participant, and wherein the first metadata represents a first emotional state of the first participant, and wherein the first communication does not accurately convey the first emotional state of the first participant;
generating, based on the first communication content, the first metadata, and second translation data applicable to the second participant, first translated communication content comprising a first embellishment for receipt by the second participant, wherein the first embellishment represents the first emotional state of the first participant to reduce a risk of miscommunication or misinterpretation of the first emotional state of the first participant;
communicating the first translated communication content to the second participant via the communication network;
receiving second communication content and second metadata via the communication network, wherein the second communication content and second metadata are associated with a second communication between the first participant and the second participant, and wherein the second metadata represents a second emotional state of the second participant;
generating, based on the second communication content, the second metadata, and first translation data applicable to the first participant, second translated communication content comprising a second embellishment for receipt by the first participant, wherein the second embellishment represents the second emotional state; and
communicating the second translated communication content to the first participant via the communication network.

17. The non-transitory machine-readable medium of claim 16, wherein the first translated communication content is associated with a first communication mode that is different from a second communication mode associated with the second translated communication content.

18. The non-transitory machine-readable medium of claim 17, wherein the first communication mode comprises a text communication mode and the second communication mode comprises an image communication mode.

19. The non-transitory machine-readable medium of claim 16, wherein the operations further comprise using the first communication content to generate the first translation data and using the second communication content to generate the second translation data.

20. The non-transitory machine-readable medium of claim 16, wherein the operations are configured for execution by core network equipment coupled with a cellular communication network.

* * * * *